UNITED STATES PATENT OFFICE.

ROSANNA CARPENTER, OF MEDFORD, MASSACHUSETTS.

IMPROVEMENT IN EXTRACTS OF FRUITS.

Specification forming part of Letters Patent No. 25,384, dated September 13, 1859.

*To all whom it may concern:*

Be it known that I, ROSANNA CARPENTER, of Medford, in the county of Middlesex and State of Massachusetts, have invented a new Extract from Fruit—such as quinces and apples—of the preparation of which the following is a full, clear, and exact description.

The object of my invention is to produce from fruit—such as quinces and apples—an extract or preserve which may be kept for a considerable length of time, and which shall be in a convenient state to make from it a rich and palatable jelly retaining the flavor or fragrance of the fruit.

That others skilled in the art may understand and use my invention, I will proceed to describe the manner in which I have carried out the same.

Take the fruit from which the extract is to be made—say quinces or apples—and having wiped them clean, either cut them in half or put them whole into a suitable boiler and cover them with water. Let them boil until tender and press out the juice. (If a small quantity is being made, the juice may be pressed out by hand; but if the operation is performed on a large scale a suitable press may be employed.) Return the juice to the boiler again and put into it as much fruit as the juice will cover, and let it boil as before. This process must be repeated until the juice is sufficiently strong, say after boiling twice or three times. Return the juice to the boiler and add thereto the white of eggs, well beaten up, at the rate of one egg to about six quarts of the juice. Let it boil for a few minutes and skim it as the impurities rise to the top. The juice is then to be put boiling hot into bottles, which are then to be corked and sealed while hot. I find bottles containing one-half pint to be a convenient size; but any size may be used.

As the bottles would be liable to break when the hot juice was poured into them if they were not tempered, they are first placed in cold water, which is gradually raised to a boiling-heat, and is then allowed to cool.

The following is the method of preparing the extract for the table. Take the contents of one bottle—say a half-pint—and add thereto half its measure of water. To this add three-fourths pound of white sugar and boil for fifteen or twenty minutes. Then strain the juice through a flannel cloth, and when cool it will form a clear firm jelly, ready for the table, which retains in a remarkable degree the flavor of the fruit from which it has been made.

This extract is in a convenient form for transportation or for use when the fruit itself cannot be obtained. I have spoken of the above extract as prepared from quinces or apples; but it may be prepared in a similar manner from a great variety of fruit—such as peaches, pears, grapes, &c.—some of them, however, requiring a less amount of water to be added.

The quantity of water above mentioned as being added to the juice is for juice that has been twice boiled. If more concentrated by a third boiling, more water may be added.

What I claim as my invention, and desire to secure by Letters Patent, is—

As a new article of manufacture, the above-described extract of fruit, prepared in the manner substantially as specified.

ROSANNA CARPENTER.

Witnesses:
 THOS. R. ROACH,
 P. E. TESCHEMACHER.